United States Patent
Meyer et al.

(10) Patent No.: US 11,231,913 B1
(45) Date of Patent: Jan. 25, 2022

(54) MODEL DRIVEN USER INTERFACE

(71) Applicant: TRACELINK, INC., North Reading, MA (US)

(72) Inventors: Jerry Meyer, Nashua, NH (US); Robert Sturim, Wenham, MA (US); Andy Nanopoulos, Wakefield, MA (US); John Williams, Malden, MA (US)

(73) Assignee: TRACELINK, INC., North Reading, MA (US)

( * ) Notice: Subject to any disclaimer, the term of this patent is extended or adjusted under 35 U.S.C. 154(b) by 0 days.

(21) Appl. No.: 16/937,350

(22) Filed: Jul. 23, 2020

(51) Int. Cl.
*G06F 8/35* (2018.01)
*G06F 9/451* (2018.01)
*G06F 3/0482* (2013.01)
*G06Q 10/10* (2012.01)
*G06F 21/62* (2013.01)
*G06F 8/38* (2018.01)

(52) U.S. Cl.
CPC .............. *G06F 8/35* (2013.01); *G06F 3/0482* (2013.01); *G06F 8/38* (2013.01); *G06F 9/451* (2018.02); *G06F 21/6218* (2013.01); *G06Q 10/105* (2013.01)

(58) Field of Classification Search
CPC .......... G06F 8/35; G06F 9/451; G06F 3/0482; G06F 8/38; G06F 21/6218; G06Q 10/105
USPC ....................................................... 717/105
See application file for complete search history.

(56) References Cited

U.S. PATENT DOCUMENTS

| | | | | |
|---|---|---|---|---|
| 5,960,173 | A * | 9/1999 | Tang | G06F 9/54 709/201 |
| 6,611,822 | B1 * | 8/2003 | Beams | G06Q 10/10 706/11 |
| 7,047,279 | B1 * | 5/2006 | Beams | G06Q 10/10 706/11 |
| 7,509,244 | B1 * | 3/2009 | Shakeri | G06F 9/5066 703/7 |
| 10,817,530 | B2 * | 10/2020 | Siebel | G06Q 10/06 |
| 10,853,082 | B1 * | 12/2020 | Aleti | G06F 9/5083 |
| 11,017,764 | B1 * | 5/2021 | Das | G06F 16/24578 |
| 11,030,021 | B1 * | 6/2021 | Driscoll | G06F 9/542 |
| 2011/0246340 | A1 * | 10/2011 | Dahod | G06Q 10/06393 705/30 |

(Continued)

*Primary Examiner* — William D Titcomb
(74) *Attorney, Agent, or Firm* — Steven M. Greenberg, Esq.; Shutts & Bowen LLP

(57) ABSTRACT

A user interface generation method for model driven architecture (MDA) architected applications includes defining multiple job functions in a model for an instance of an MDA architected application, each referencing one or more user interface (UI) experiences for the application, each experience including a single menu and one or more screens, each screen including one or more UI components. Thereafter, each end user of the instance is associated with one or more job functions. Then, in response to receiving an event on an event bus servicing the instance, an event handler for UI events in the instance selects an experience corresponding to the defined job function for the end user specified by the event, retrieves a screen of the selected experience based upon the event and transmits for display to the specified end user a specification of a graphical UI representative of the retrieved screen including the single menu for the selected experience.

12 Claims, 2 Drawing Sheets

(56) References Cited

U.S. PATENT DOCUMENTS

| | | | |
|---|---|---|---|
| 2013/0262372 A1* | 10/2013 | Dahod | G06F 16/1794 |
| | | | 707/607 |
| 2014/0181965 A1* | 6/2014 | Kling | H04L 63/105 |
| | | | 726/21 |
| 2016/0057020 A1* | 2/2016 | Halmstad | H04L 67/26 |
| | | | 715/740 |
| 2016/0239272 A1* | 8/2016 | Petri | G06F 8/20 |
| 2017/0006135 A1* | 1/2017 | Siebel | H04L 69/40 |
| 2017/0199989 A1* | 7/2017 | Lilko | G06F 21/10 |
| 2018/0262573 A1* | 9/2018 | Przybylski | G05B 15/02 |
| 2021/0248278 A1* | 8/2021 | Solomon | G06F 30/12 |

* cited by examiner

MODEL DRIVEN USER INTERFACE

BACKGROUND OF THE INVENTION

Field of the Invention

The present invention relates to the field of user interface generation and more particularly to the presentation of a user interface in a model driven architecture.

Description of the Related Art

A model driven architecture (MDA) refers to a software development paradigm in which the functional specification of a computer program is held separate from the underlying technical implementation of the functional specification. The functional specification becomes a model reflective of the underlying real-world problem addressed by the computer program—the computation independent model (CIM). The functional specification for the computer program is then produced as a transformation of the CIM into a model expressed according to a modeling language such as the Unified Modeling Language (UML) using business process modeling (BPM) notation—the platform independent model (PIM). Consequently, in MDA, the model exists independently from the constraints of the computing platform supporting different instances of the model during run-time so that the model can be ported to nearly any underlying computing platform—the platform specific model (PSM) from which source code may then be automatically generated.

In MDA, the user interface is the representation of the underlying model and is expressed as part of the PIM. All actions taken as part of the MDA architected program remain part of the PIM, for example, screen navigation. Yet, the user interface, including navigation options, may vary based upon a role of an end user interacting with the user interface. Indeed, in an MDA architected program, the role of each end user in of itself is included as a portion of the PIM. Consequently, changing the user experience for a particular role in an MDA architected program requires the intervention of an application programmer skilled in the art of MDA development. So much, though, runs counter to the trend of self-service, solution-space driven software development in which the end user, irrespective of technical wherewithal, elect to adapt a generic application to the specific needs of the end user.

BRIEF SUMMARY OF THE INVENTION

Embodiments of the present invention address deficiencies of the art in respect to user interface definition in an MDA architected application and provide a novel and non-obvious method, system and computer program product for model driven user interface generation in an MDA application. In an embodiment of the invention, a user interface generation method for MDA architected applications begins with the definition of multiple job functions in a model for an instance of an MDA architected application, and the definition of multiple different roles in the model for the instance of the MDA architected application. Each role corresponds to a different level of access control in which a corresponding end user is permitted to access certain data in the MDA architecture application as well as certain operations presented within a user interface (UI) for the MDA architected application. Each job function, turn, references one or more UI experiences for the application. As well, each of the UI experiences includes a single menu and one or more screens. Each of the screens, in turn, includes one or more UI components. Thereafter, each end user of the instance of the application may be associated with one or more of the job functions.

Then, in response to the receipt of an event on an event bus of a host computing platform servicing the instance, an event handler for user interface events in the instance of the application selects one of the UI experiences corresponding to one of the defined job functions for an end user specified by the event. Optionally, the selection of the one of the UI experiences can be further performed in respect to a defined role for the end user. Thereafter, the event handler retrieves a screen of the selected one of the UI experiences based upon the event. Finally, the event handler provides to a client computer of the specified one of the end users, a specification of a graphical UI representative of the retrieved screen including the single menu for the selected one of the UI experiences with operations presented in the single menu and in UI components of the screen accounting for the role of the end user.

In one aspect of the embodiment, each corresponding one of the UI components specifies a location in a corresponding one of the screens at which the corresponding one of the UI components is to be rendered. In another aspect of the embodiment, a graphical UI may be transmitted to the client computer, providing a palette of graphical representations of a set of the different components associated with a corresponding one of the job functions for the specified one of the end users and a blank canvas of a new screen for one of the UI experiences of the corresponding one of the job functions. As such, different selected ones of the components may be received in the graphical UI in the palette at locations in the screen specified within the canvas. Finally, a new screen specified in the graphical UI may be included in the definition of the corresponding one of the job functions.

In another embodiment of the invention, a data processing system may be adapted for user interface generation in an MDA architected application. The system includes a host computing platform having one or more computers, each with memory and at least one processor. The system also includes a user interface generation module including computer program instructions enabled while executing in the host computing platform to define in the memory of the host computing platform, a multiplicity of job functions in a model for an instance of an MDA architected application, each job function referencing one or more UI experiences for the application, each of the UI experiences including a single menu and one or more screens, each of the screens including one or more UI components.

The program instructions further are enabled to associate in the memory each different end user of the instance of the application with one or more of the job functions, and optionally, one or more roles, and receive an event on an event bus of the host computing platform servicing the instance, the event specifying one of the end users. Finally, the program instructions are enabled to respond to the event in an event handler for user interface events in the instance of the application by selecting one of the UI experiences corresponding to one of the defined job functions for the specified one of the end users, and optionally in respect to the role of the specified one of the end users, retrieving a screen of the selected one of the UI experiences based upon the event and transmitting, to a client computer of the specified one of the end users, a specification of a graphical UI representative of the retrieved screen and including the single menu for the selected one of the UI experiences.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for user interface generation in an MDA architected application. In accordance with an embodiment of the invention, different UI models are defined for different roles and different job functions in the form of different UI experiences. Each UI experience is defined to include one or more screens, each of which in turn is defined to include one or more UI components including UI components directing corresponding data access operations in the MDA architected application. Thereafter, each end user accessing a common instance of an MDA architected application executing in a host computing platform receives a correspondingly assigned job function and role. Then, as UI events are posted onto an event bus for the MDA architected application, a specified one of the end users for each of the UI events may be determined and a corresponding UI assembled dynamically for the specified one of the end users according to the job function and role assigned to the specified one of the end users. In this way, augmenting or changing the UI for the MDA architected application is as simple a matter as changing the specification of one or more of the UI experiences or adding a new UI experience in association with a job function and role for the MDA architected application.

Figure 1:
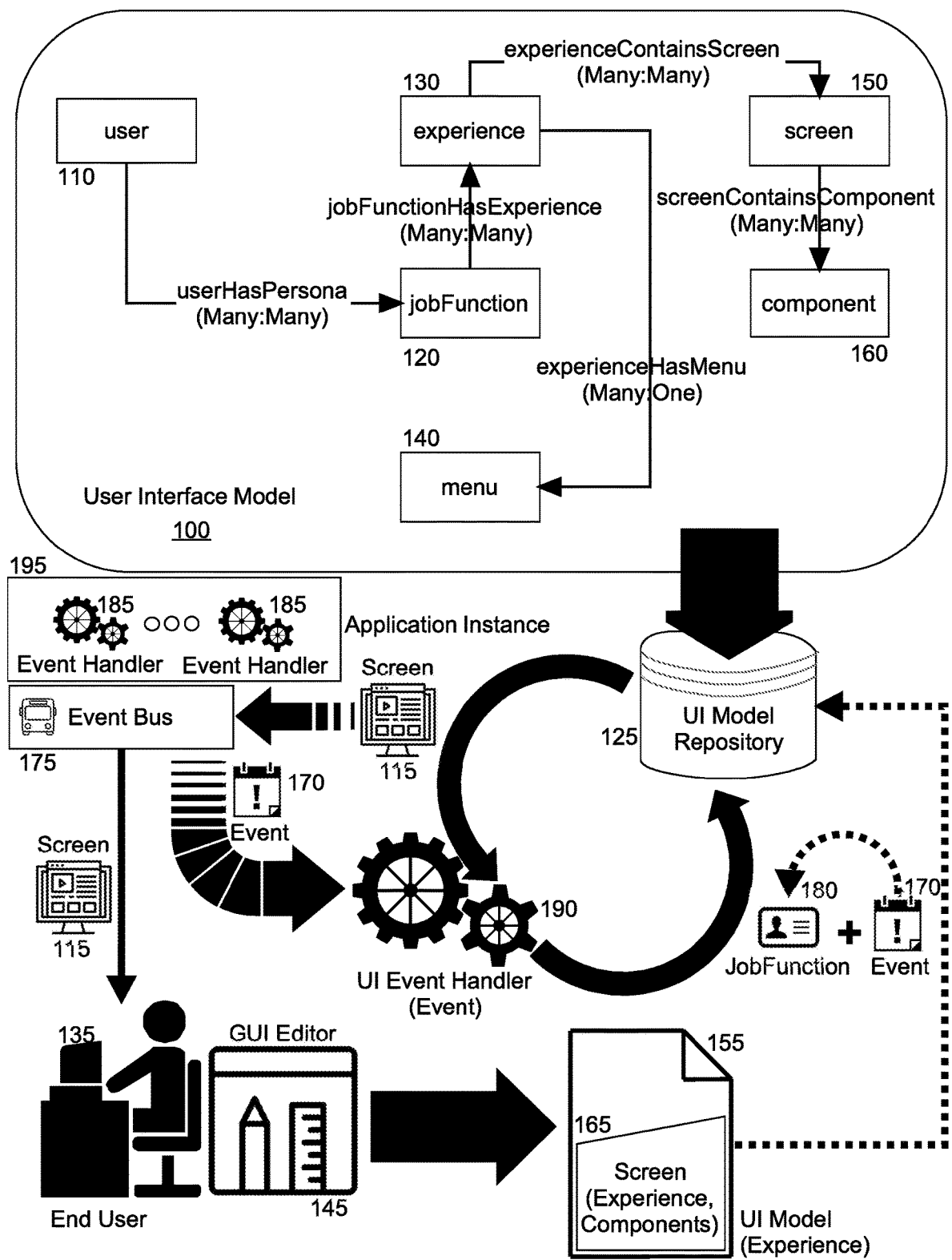
FIG. 1 is pictorial illustration of a process for user interface generation in an MDA architected application.

In further illustration, FIG. 1 is pictorial illustration of a process for user interface generation in an MDA architected application. As shown in FIG. 1, an application instance 195 of an MDA architected application includes different event handlers 185 communicating with one another over an event bus 175 and providing a UI posting events onto the event bus 175. The UI itself is generated based upon a user interface model 100 disposed within a UI repository 125. The user interface model 100 defines for each user 110 of an application, one or more roles (not shown) and one or more job functions 120 with each job function 120 having one or more UI experiences 130 and each of the UI experiences 130 having both one or more screens 150 and a single menu 140 of menu options, selected according to the role, directing different UI actions within the application including navigation to different ones of the screens 150 of the experience 130. Finally, each of the screens 150 provides a UI display of one or more components 160. In this way, each experience 130 provides a different collection of UI screens for the application and different job functions 120 have different experiences 130 so that an end user 110 assigned to a particular one of the job functions 120 will receive a corresponding UI for the application based upon the experiences 130 of the particular one of the job functions 120.

During execution of the application instance 195, a UI event 170 may be posted onto the event bus 175 indicating a request to render a screen in a computing device of an end user 135. A UI event handler 190 processes the event 170 by identifying from the event, the end user 135 and locating a job function 180 in the user interface model 100 for the end user 135. The UI event handler 190 then locates a particular screen 115 in the user interface model 100 for an associated UI experience assigned to the end user 135 based upon the action specified in the event 170 and the job function 180. The UI event handler 190 then returns the screen 115 onto the event bus 175 for delivery to the computing device of the end user 135.

As it will be understood, then, the UI presented to the end user 135 may be extended without altering the program code of the UI event handler 190 by defining a new experience 130 for the job function 120 of the end user 135, or modifying an existing experience 130 with one or more screens 150, each with one or more different UI components 160 and a menu 140 of actions to be taken in the experience 130. To that end, a graphical UI editor 145 may be provided for the benefit and use of the end user 135 in which a palette of UI components 160 may be selectably presented for drag and drop manipulation onto a canvas so as to define a screen 165, along with a list of menu items (actions) also that may be included as the menu of the experience 130 to which the screen 165 is assigned. Once complete, the screen 165 may be transformed into a screen definition 155 and incorporated into the user interface model 100 in the UI model repository 125.

Figure 2:
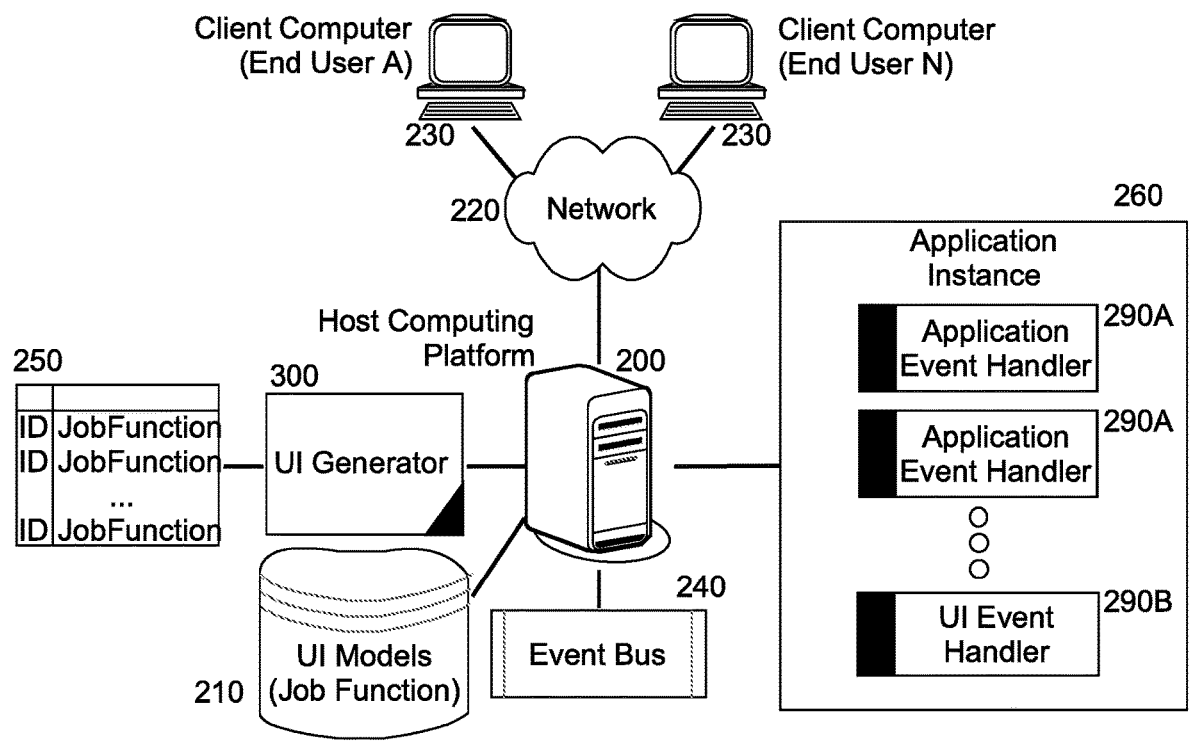
FIG. 2 is a schematic illustration of a host computing platform supporting a process for user interface generation in an MDA architected application; and, FIG. 3 is a flow chart illustrating a process for user interface generation in an MDA architected application.

The process described in connection with FIG. 1 may be implemented in a host computing platform. In more particular illustration, FIG. 2 schematically shows a host computing platform supporting a process for user interface generation in an MDA architected application. The system includes a host computing platform 200 that includes one or more computers, each with memory and at least one processor. An application instance 260 executes within the memory of the host computing platform 200 and includes a multiplicity of different event handlers 290A, 290B processing events posted in the application instance 260 onto an associated event bus 240. Finally, the host computing platform 200 is communicatively coupled over computer communications network 220 to different client computers 230, each associated with a different end user of the application instance 260.

Of note, the system includes a UI generation module 300. The module 300 includes computer program instructions that execute in the memory of the host computing platform 200. The program instructions are operable to receive a UI event from UI event handler 290B on the event bus 240 directed to the generation of a UI screen for an end user viewing the screen through a corresponding one of the client computers 230. The program instructions are further operable to process the event by identifying the end user and locating both a job function and a role for the end user in table 250. The program instructions then consult a UI model 210 for the combination of job function and role of the end user so as to locate a pre-specified screen for display based upon an experience associated with the job function and data access rights correspondintg to the role, and a particular screen of the experience set forth in respect to the event. In this way, the UI provided to the end user is dynamically determined according to the UI model 210 which may be varied not by modifying the program code of the application event handlers 290A, 290B, but by modifying the specification of a UI experience for the end user within the UI model 210.

Figure 3:
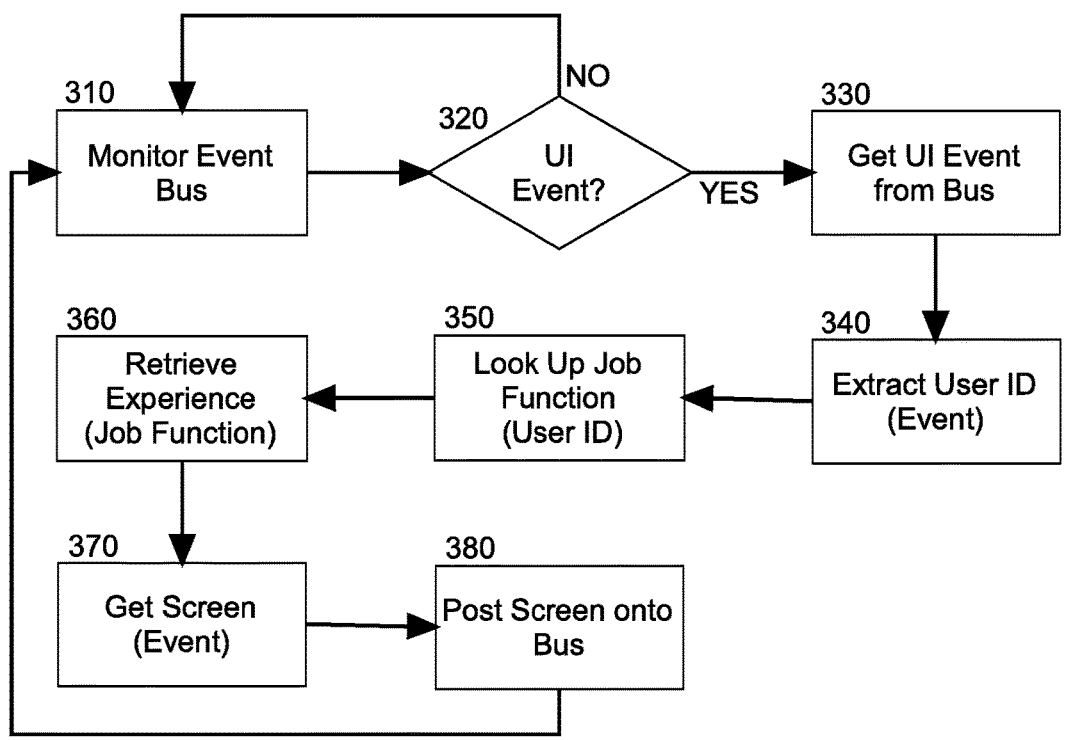

In even yet further illustration of the operation of the UI generation module 300, FIG. 3 is a flow chart illustrating a process for user interface generation in an MDA architected application. Beginning in block 310, the event bus for the application instance is monitored for UI events. In decision block 320, on condition that a UI event is detected, in block 330, the UI event is retrieved from the event bus and a user ID for an associated user extracted from the event in block 340. Then, in block 350, a job function and role assigned to the end user ID is determined and in block 360 an experience selected for the determined job function and role. In block 370, a screen of the experience is retrieved based upon the event, and potentially limited by the role. Finally, in block 380 the retrieved screen is placed onto the event bus for transmission to a display of the end user.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for user interface generation in a model driven architecture (MDA) architected application, the method comprising:
    defining in memory of a host computing platform, a multiplicity of job functions in a model for an instance of an MDA architected application, each job function referencing one or more user interface (UI) experiences for the application, each of the UI experiences comprising a single menu and one or more screens, each of the screens comprising one or more UI components;
    associating in the memory each of multiple different end users of the instance of the application with one or more of the job functions;
    receiving an event on an event bus of the host computing platform servicing the instance, the event specifying one of the end users; and,
    responding to the event in an event handler for user interface events in the instance of the application by selecting one of the UI experiences corresponding to one of the defined job functions for the specified one of the end users, retrieving a screen of the selected one of the UI experiences based upon the event and transmitting, to a client computer of the specified one of the end users, a specification of a graphical UI representative of the retrieved screen and including the single menu for the selected one of the UI experiences.

2. The method of claim 1, wherein each corresponding one of the UI components specifies a location in a corresponding one of the screens at which the corresponding one of the UI components is to be rendered.

3. The method of claim 1, further comprising:
    transmitting to the client computer, a graphical UI providing a palette of graphical representations of a set of the different components associated with a corresponding one of the job functions for the specified one of the end users and a blank canvas of a new screen for one of the UI experiences of the corresponding one of the job functions;
    receiving in the graphical UI different selected ones of the components in the palette at locations in the screen specified within the canvas; and,
    including in the definition of the corresponding one of the job functions, a new screen specified in the graphical UI.

4. The method of claim 1, further comprising:
    additionally defining in memory of a host computing platform, a multiplicity of roles in the model for the instance of the MDA architected application, each role corresponding to data access control rights for accessing data in the MDA architected application;
    additionally associating in the memory each of multiple different end users of the instance of the application with one or more of the roles; and,
    performing the selection of the one of the UI experiences based upon not only to the one of the defined job functions for the specified one of the end users but also to one of the roles for the specified one of the end users.

5. A data processing system adapted for user interface generation in a model driven architecture (MDA) architected application, the system comprising:
    a host computing platform comprising one or more computers, each comprising memory and at least one processor; and,
    a user interface generation module comprising computer program instructions enabled while executing in the host computing platform to perform:
        defining in the memory of the host computing platform, a multiplicity of job functions in a model for an instance of an MDA architected application, each job function referencing one or more user interface (UI) experiences for the application, each of the UI experiences comprising a single menu and one or more screens, each of the screens comprising one or more UI components;
        associating in the memory each of multiple different end users of the instance of the application with one or more of the job functions;
        receiving an event on an event bus of the host computing platform servicing the instance, the event specifying one of the end users; and,
        responding to the event in an event handler for user interface events in the instance of the application by selecting one of the UI experiences corresponding to one of the defined job functions for the specified one of the end users, retrieving a screen of the selected one of the UI experiences based upon the event and transmitting, to a client computer of the specified one of the end users, a specification of a graphical UI representative of the retrieved screen and including the single menu for the selected one of the UI experiences.

6. The system of claim 5, wherein each corresponding one of the UI components specifies a location in a corresponding one of the screens at which the corresponding one of the UI components is to be rendered.

7. The system of claim 5, wherein the program instructions of the module further perform:
    transmitting to the client computer, a graphical UI providing a palette of graphical representations of a set of the different components associated with a corresponding one of the job functions for the specified one of the end users and a blank canvas of a new screen for one of the UI experiences of the corresponding one of the job functions;
    receiving in the graphical UI different selected ones of the components in the palette at locations in the screen specified within the canvas; and,
    including in the definition of the corresponding one of the job functions, a new screen specified in the graphical UI.

8. The system of claim 5, wherein the program instructions of the module further perform:
    additionally defining in memory of a host computing platform, a multiplicity of roles in the model for the instance of the MDA architected application, each role corresponding to data access control rights for accessing data in the MDA architected application;
    additionally associating in the memory each of multiple different end users of the instance of the application with one or more of the roles; and,
    performing the selection of the one of the UI experiences based upon not only to the one of the defined job functions for the specified one of the end users but also to one of the roles for the specified one of the end users.

9. A computer program product for user interface generation in a model driven architecture (MDA) architected application, the computer program product including a nontransitory computer readable storage medium having program instructions embodied therewith, the program instructions executable by a device to cause the device to perform a method including:
  defining in memory of a host computing platform, a multiplicity of job functions in a model for an instance of an MDA architected application, each job function referencing one or more user interface (UI) experiences for the application, each of the UI experiences comprising a single menu and one or more screens, each of the screens comprising one or more UI components;
  associating in the memory each of multiple different end users of the instance of the application with one or more of the job functions;
  receiving an event on an event bus of the host computing platform servicing the instance, the event specifying one of the end users; and,
  responding to the event in an event handler for user interface events in the instance of the application by selecting one of the UI experiences corresponding to one of the defined job functions for the specified one of the end users, retrieving a screen of the selected one of the UI experiences based upon the event and transmitting, to a client computer of the specified one of the end users, a specification of a graphical UI representative of the retrieved screen and including the single menu for the selected one of the UI experiences.

10. The computer program product of claim 9, wherein each corresponding one of the UI components specifies a location in a corresponding one of the screens at which the corresponding one of the UI components is to be rendered.

11. The computer program product of claim 9, wherein the method further comprises:
  transmitting to the client computer, a graphical UI providing a palette of graphical representations of a set of the different components associated with a corresponding one of the job functions for the specified one of the end users and a blank canvas of a new screen for one of the UI experiences of the corresponding one of the job functions;
  receiving in the graphical UI different selected ones of the components in the palette at locations in the screen specified within the canvas; and,
  including in the definition of the corresponding one of the job functions, a new screen specified in the graphical UI.

12. The computer program product of claim 9, wherein the method further comprises:
  additionally defining in memory of a host computing platform, a multiplicity of roles in the model for the instance of the MDA architected application, each role corresponding to data access control rights for accessing data in the MDA architected application;
  additionally associating in the memory each of multiple different end users of the instance of the application with one or more of the roles; and,
  performing the selection of the one of the UI experiences based upon not only to the one of the defined job functions for the specified one of the end users but also to one of the roles for the specified one of the end users.

\* \* \* \* \*